(12) United States Patent
Yamamoto

(10) Patent No.: US 6,788,006 B2
(45) Date of Patent: Sep. 7, 2004

(54) DISCHARGE LAMP BALLAST WITH DIMMING

(75) Inventor: Norikazu Yamamoto, Yawata (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/447,166

(22) Filed: May 27, 2003

(65) Prior Publication Data

US 2003/0222593 A1 Dec. 4, 2003

(30) Foreign Application Priority Data

May 31, 2002 (JP) ........................................ 2002-160403

(51) Int. Cl.[7] .............................................. H05B 37/02
(52) U.S. Cl. ...................... 315/219; 315/276; 315/291; 315/360; 315/DIG. 4
(58) Field of Search ............................ 315/209 R, 219, 315/226, 246, 276, 279, 282, 291, 301, 307, 360, DIG. 4, DIG. 7

(56) References Cited

U.S. PATENT DOCUMENTS

| | | | |
|---|---|---|---|
| 4,210,846 A | | 7/1980 | Capewell et al. ........... 315/121 |
| 5,371,439 A | * | 12/1994 | Griffin ..................... 315/209 R |
| 5,583,402 A | * | 12/1996 | Moisin et al. ............... 315/307 |
| 6,013,969 A | * | 1/2000 | Noma et al. ................. 310/318 |
| 6,153,962 A | * | 11/2000 | Noma et al. ............. 310/316.01 |
| 6,331,748 B1 | * | 12/2001 | Hong ........................ 310/318 |

FOREIGN PATENT DOCUMENTS

| | | |
|---|---|---|
| DE | 199 03 015 A1 | 8/2000 |
| EP | 0 123 963 A2 | 11/1984 |
| JP | 4-253194 | 9/1992 |
| JP | 06-243987 | * 9/1994 |
| JP | 2001-148296 | 5/2001 |
| JP | 2001-267093 | 9/2001 |
| JP | 2001-319796 | 11/2001 |
| JP | 2002-075684 | 3/2002 |

* cited by examiner

Primary Examiner—Thuy Vinh Tran
(74) Attorney, Agent, or Firm—Merchant & Gould P.C.

(57) ABSTRACT

A ballast includes a rectangular wave generating circuit that generates a rectangular wave signal; a driving signal generating circuit supplied with the rectangular wave signal and a dimmer signal of a PWM waveform of a frequency lower than that of the rectangular wave signal and outputting a driving signal of an output obtained by extracting the rectangular wave signal for a period corresponding to "on" period of the dimmer signal; a pulse transformer which is supplied with a rectangular wave voltage based on the driving signal, step up the rectangular wave voltage and applying it to a discharge lamp. A rectangular wave reset circuit is provided so as to reset the generation of the rectangular wave signal at a rising of the dimmer signal. The driving signal generating circuit extracts the rectangular wave signal for a period starting from when the dimmer signal is turned on, until a time at which the dimmer signal and the rectangular wave signal are both off.

12 Claims, 8 Drawing Sheets

FIG. 10
PRIOR ART (a) Rectangular Wave Signal Vp (b) Dimmer Signal Vdim (c) Driving Signal VL

FIG. 11
PRIOR ART (a) Dimmer Signal Vdim (b) Rectangular Wave Signal Vp (c) Rectangular Wave Signal Vp (d) Driving Signal VL (e) Driving Signal VL

FIG. 12
PRIOR ART

DISCHARGE LAMP BALLAST WITH DIMMING

FIELD OF THE INVENTION

The present invention relates to a discharge lamp ballast in which the discharge lamp is dimmed by rectangular wave voltages, for example a discharge lamp ballast suitable for dimming external electrode type discharge lamps, which are used as backlights for liquid crystal displays.

BACKGROUND OF THE INVENTION

As backlights in, for example, liquid crystal displays, there has been intensive research into rare gas discharge lamp devices of an external electrode type that use dielectric barrier discharge. The basic reason for this is that rare gas discharge lamp devices do not use mercury, and therefore do not incur the reduced luminous efficiency that accompanies the rise in temperature of mercury. They are also preferable for environmental reasons.

Figure 10:
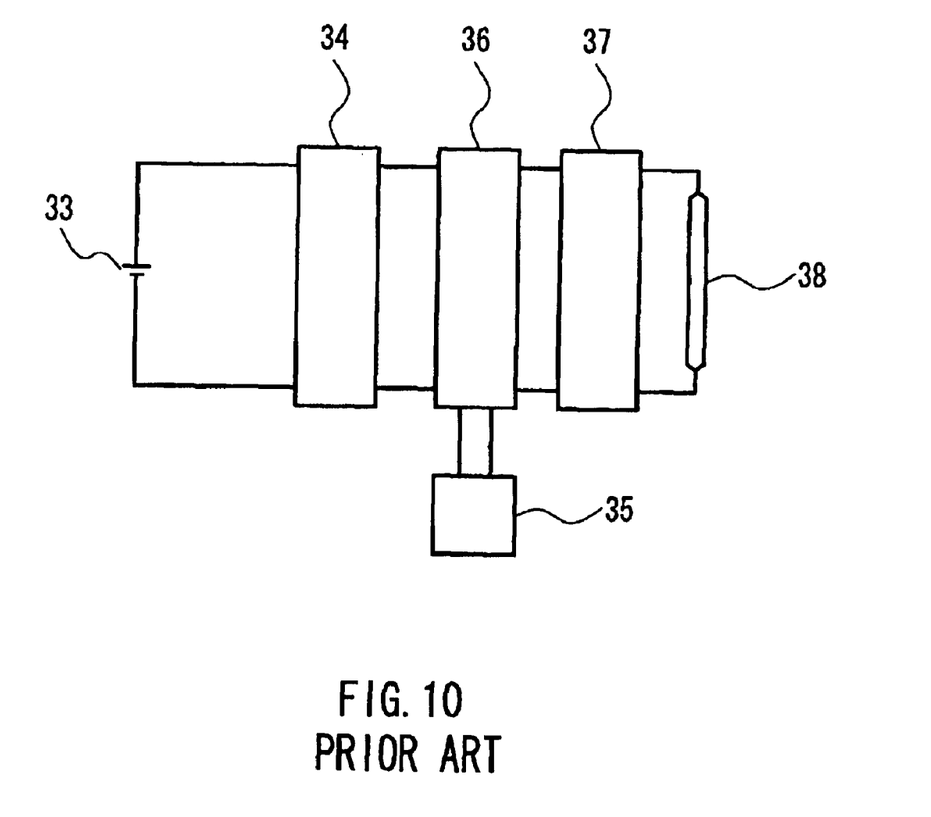
FIG. 10 is a block diagram showing a conventional example of discharge lamp ballast.

The lamp operation using dielectric barrier discharge depends on an effect in which a gas discharge is caused with the high voltage generated when charging the dielectric layer by application of a driving voltage and then inverting the driving voltage. For this purpose, a high frequency rectangular wave voltage is used as the driving voltage. An example of a discharge lamp ballast that dims the discharge lamp with a rectangular wave voltage is disclosed in JP 2001-267093A. As shown in FIG. 10, this discharge lamp ballast includes a DC power source 33, a rectangular wave generating circuit 34, a dimmer control circuit 35, a synchronization circuit 36, a pulse transformer 37, and a discharge lamp 38 having one external electrode.

Figure 11:
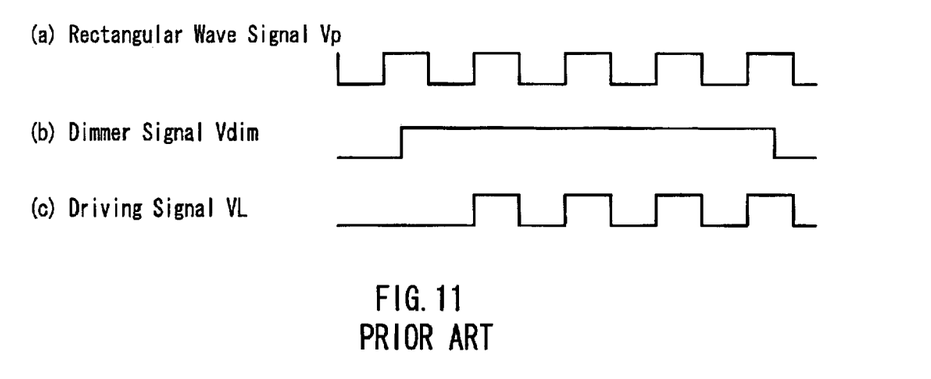
FIG. 11 is a waveform diagram showing the functioning of the device in FIG. 10.

The rectangular wave generating circuit 34 shapes the DC voltage supplied from the DC power source 33 into, as shown as a waveform (a) in FIG. 11, a high frequency rectangular wave signal Vp of predetermined frequency. The dimmer control circuit 35 outputs a dimmer signal Vdim with the PWM waveform (b) in FIG. 11, and supplies it to the synchronization circuit 36. From the high-frequency rectangular wave signal Vp, the synchronization circuit 36 extracts, as a driving signal VL, a burst waveform corresponding to the ON period of the dimmer signal Vdim (c) in FIG. 11. Based on the driving signal VL, a rectangular wave voltage for driving the lamp, which has been raised with the pulse transformer 37, is applied to the discharge lamp 38, and lights the discharge lamp 38. In this configuration, dimming is performed by changing the duty factor of the dimmer signal Vdim.

However, the phases of the dimmer signal Vdim and the rectangular wave signal Vp are not always in agreement. And for that reason, when the extraction of the rectangular wave signal Vp is turned on/off at the same time that the dimmer signal Vdim is turned on/off, the extracted driving signal VL sometimes includes rectangular pulses of incomplete widths at the beginning or end of sequences. When using dielectric barrier discharge for lamp operation, and when the applied rectangular wave is not wide enough, then the amount of charge supplied to the dielectric layer may be insufficient, so that the discharge lamp 38 will not emit light. When this non-emission occurs under a condition of the dimmer ratio of 10% or less, this causes a flickering sensation. Therefore, in order to suppress flickering under a condition of a high dimming ratio, it is necessary that all the rectangular pulses contained in the driving signal VL maintain the waveform of the rectangular wave signal Vp.

The ballast disclosed in JP 2002-75684A, for example, meets this condition. With this device, the dimmer signal is digitized by A/D conversion, and the number of generated driving signal pulses is controlled based on that digital value. Since the output of the rectangular waveform of the driving signal VL is controlled digitally, rectangular pulses of incomplete widths are not output. However, with this device, to change the frequency of the dimmer signal (the dimmer frequency), it is necessary to change the entire circuit configuration. Therefore, in practical terms, the frequency is fixed. Conventionally, when discharge lamps are used as the backlights for liquid crystal displays, in order to prevent the interference of noise with the liquid crystal display, it is preferable to set the dimmer frequency to conform to the driving circuit of the liquid crystal. Therefore, the discharge lamp disclosed in JP 2002-75684A, in which the dimmer frequency is fixed, is lacking in versatility. Moreover, because it uses a microcomputer, the ballast is complex and therefore expensive.

In contrast to this, the ballast in JP 2001-267093A has a freely adjustable dimmer frequency, a simple configuration, and is inexpensive. Moreover, JP 2001-267093A describes a configuration for maintaining an appropriate waveform for the rectangular pulses of the driving signal VL. With this ballast, the timing for extracting the rectangular wave signal Vp is controlled as follows via the synchronization circuit 36 shown in FIG. 10. First, at the beginning of the driving signal VL, the extraction of the rectangular wave signal Vp begins at a rising of the rectangular wave signal Vp during the period in which the dimmer signal Vdim is on. At the end of the driving signal VL, even when dimmer signal Vdim is turned off, the extraction of the rectangular wave signal Vp continues until the falling of rectangular wave signal Vp. Therefore, as shown by the waveform (c) in FIG. 11, only driving signals VL that are composed of complete waveforms are input to the pulse transformer 37.

However, there are the following problems with the discharge lamp ballast in JP 2001-267003A: If the frequency of the rectangular wave signal Vp is not an integer multiple of the dimmer signal Vdim, this may lead to the problem of the phase difference between the two waveforms changing with time. This is explained with reference to FIG. 12.

Figure 12:
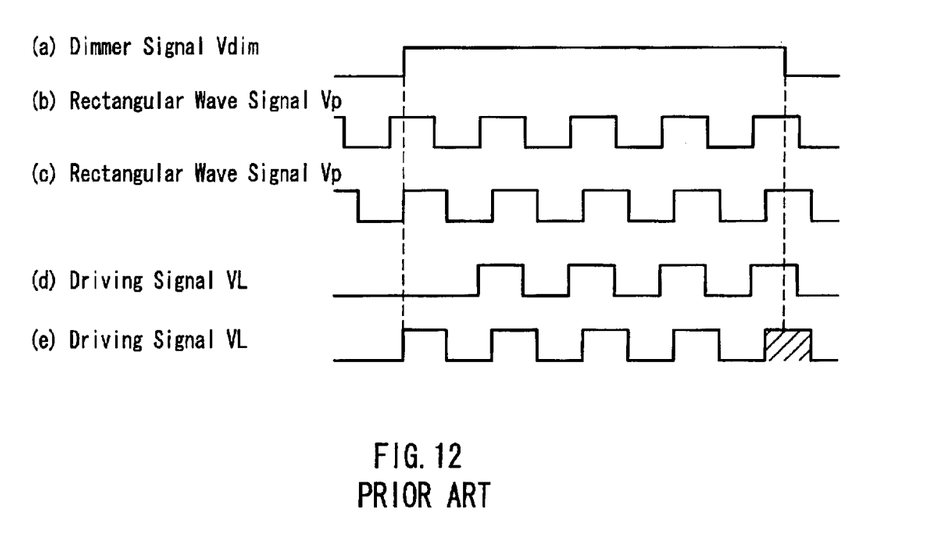
FIG. 12 is a waveform diagram illustrating the problem of the device in FIG. 10.

In FIG. 12, a waveform (a) illustrates the dimmer signal Vdim, and waveforms (b) and (c) illustrate two rectangular wave signals Vp having different phase differences with respect to the dimmer signal Vdim. Waveforms (d) and (e) show the driving signals VL that have been generated from the rectangular wave signals Vp (b) and (c), respectively. In the case of the waveform (b), the ON period of the dimmer signal Vdim starts while the rectangular wave signal Vp is ON. Consequently, the driving signal VL is output after the next ON timing of the rectangular wave signal Vp. On the other hand, in the case of the waveform (c), both the dimmer signal Vdim and the rectangular wave signal Vp are turned on in synchronization. Consequently, the driving signal VL is output at the same time as the start of the ON period of the dimmer signal Vdim. On the other hand, after the ON period of the dimmer signal Vdim has been completed, in both cases of the waveforms (b) and (c), the ON period of the rectangular wave signal Vp has not yet completed, so that it is extracted as the driving signal VL until the falling of the rectangular wave signal Vp. As a result, the driving signal VL (e) in FIG. 12 contains one pulse more (the hatched pulse in the figure) than in the case of the waveform (d).

Thus, if the number of pulses of the driving signal VL for a dimmer signal Vdim of the same duty factor changes, then this may cause flickering in the discharge lamp 38. In particular when the dimming ratio is high, and consequently the duty factor of the dimmer signal Vdim is low (the ON period is short), then the number of pulses of the driving signal VL included in the ON period of the dimmer signal Vdim is small, so that there is a large change in the emitted luminance depending on whether there is one pulse more or less, and the extent of flickering becomes large.

In addition to this problem, when the AC rectangular wave voltage produced from the driving signal VL is stepped up with a pulse transformer, the following problems occur: When the rectangular wave voltage applied to the pulse transformer becomes zero at the end of the driving signal VL, ringing occurs due to uncontrolled voltage oscillations. Due to this ringing, the waveform of the output of the pulse transformer corresponding to the end of the driving signal VL becomes chaotic, so that erroneous discharges of the discharge lamp occur, which cause flickering. This problem cannot be solved by optimizing the generation of the driving signal VL from the rectangular wave signal Vp. The effect of this is significant in particular for high dimming ratios.

SUMMARY OF THE INVENTION

Therefore, with the foregoing in mind, it is an object of the present invention to provide a discharge lamp ballast that operates a discharge lamp with a rectangular wave voltage, with which the dimming frequency can be set freely, and flickering under high dimming ratios can be suppressed.

A discharge lamp ballast in accordance with the present invention includes a rectangular wave generating circuit that generates a rectangular wave signal of a predetermined frequency; a driving signal generating circuit into which the rectangular wave signal and a dimmer signal of a PWM waveform of a frequency lower than that of the rectangular wave signal are input, and which outputs, as a driving signal, a signal obtained by extracting the rectangular wave signal for a period corresponding to a period in which the dimmer signal is on; and a pulse transformer in which a rectangular wave voltage based on the driving signal is applied to the primary side, and the rectangular wave voltage is stepped up and applied to a discharge lamp.

In order to solve the above-described problems, a discharge lamp ballast according to a first aspect of the present invention is provided with a rectangular wave reset circuit that resets the operation of generating the rectangular wave signal with the rectangular wave generating circuit at a rising of the dimmer signal. The driving signal generating circuit extracts the rectangular wave signal for a period starting from when the dimmer signal is turned on, until a time at which the dimmer signal and the rectangular wave signal are both off.

A discharge lamp ballast according to a second aspect of the present invention is provided with an output reset circuit that inputs a pulse voltage in phase with the rectangular wave AC voltage to the pulse transformer immediately after the end of the rectangular wave AC voltage in response to the completion of the ON period of the dimmer signal, the secondary side output of the pulse transformer being attenuated by application of the pulse voltage.

DESCRIPTION OF THE PREFERRED EMBODIMENTS

With the discharge lamp ballast according to the first aspect of the present invention, the rectangular wave reset circuit resets the operation of generating the rectangular wave signal at a rising of the dimmer signal, and the driving signal generating circuit extracts the rectangular wave signal for a period starting from when the dimmer signal is turned on, until a time at which the dimmer signal and the rectangular wave signal are both off. Consequently, the phase of the rectangular wave signal is always made constant with respect to the start of the ON period of the dimmer signal. The result of this is that, even when the frequency of the rectangular wave signal is not an integer multiple of the frequency of the dimmer signal, the wave number of the extracted rectangular wave signal is constant with respect to a dimmer signal with a constant duty factor, thereby reducing the flickering of light emitted from the discharge lamp.

The rectangular wave reset circuit can be configured to reset the oscillation of the rectangular wave generating circuit. More specifically, the rectangular wave reset circuit can be provided with a first differential circuit to which the dimmer signal is input, and a first switching circuit that is driven by the output of the first differential circuit, wherein a node between a capacitor and a resistor composing a CR oscillator in the rectangular wave generating circuit is connected to a ground potential via the first switching circuit.

According to a second aspect of the present invention, the output reset circuit applies a pulse voltage that is in phase with a rectangular wave AC voltage to the pulse transformer immediately after the end of the rectangular wave AC voltage in response to the completion of the ON period of the dimmer signal, and a secondary side output of the pulse transformer is attenuated by this, thus suppressing ringing. The result of this is that, even at the completion of the driving signal VL, the output of the pulse transformer is an appropriate waveform for causing the discharge lamp to emit light, and flickering is suppressed.

In this configuration, it is possible further to provide a second switching circuit that is inserted between the driving signal generating circuit and the pulse transformer, and that has two switching elements that are driven alternately in response to the driving signal. By inputting the output of the switching elements to the pulse transformer, the rectangular wave AC voltage is applied to the pulse transformer, and the output reset circuit supplies an output reset signal that momentarily drives the switching element that was not being driven immediately prior to the end of the rectangular wave AC voltage. Furthermore, the output reset circuit may include a second differential circuit in which the driving signal is input, and in which the output of the second differential circuit is supplied as the output reset signal. It is preferable that the pulse width of the output reset signal is not greater than one-quarter of one cycle of the waveform of the driving signal.

In the above mentioned configurations, the rectangular wave generating circuit may be composed of a timer circuit. Furthermore, the discharge lamp may be an external electrode type discharge lamp, in which at least one electrode of the discharge lamp is provided at an outer surface of an arc tube. In this case, the discharge material of the discharge lamp may include a rare gas.

Figure 1:
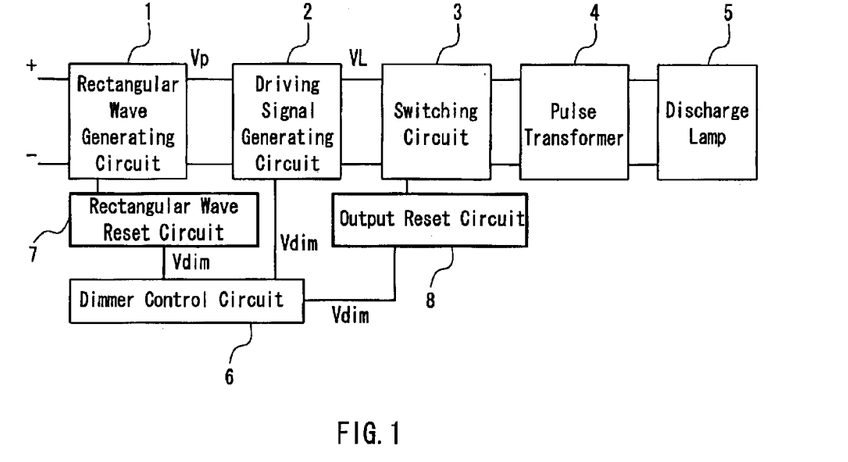
FIG. 1 is a block diagram showing a discharge lamp ballast according to an embodiment of the present invention.
Figure 2:
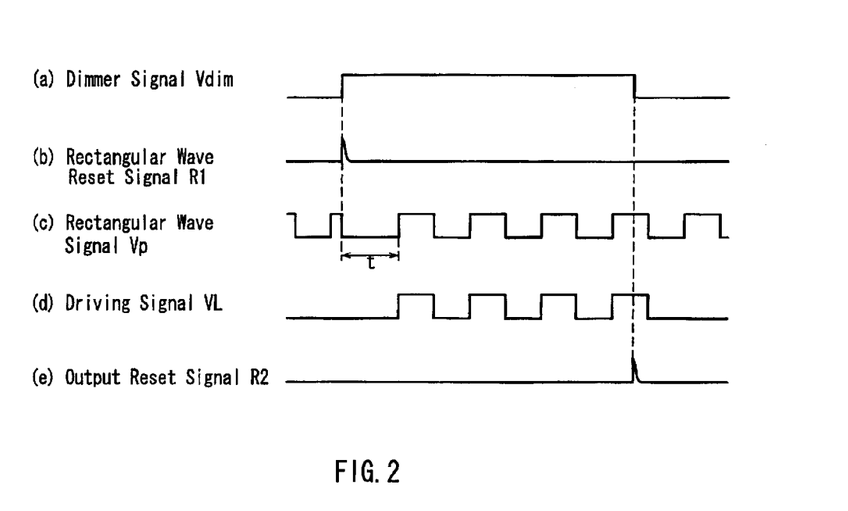
FIG. 2 is a waveform diagram illustrating the functioning of the device in FIG. 1.

Embodiments of the present invention are explained in more detail, referring to the accompanying drawings. FIG. 1 is a block diagram showing a discharge lamp ballast. FIG. 2 shows the waveforms of each part of the device in FIG. 1.

A rectangular wave generating circuit 1 generates a high frequency rectangular wave signal Vp (see a waveform (c) in FIG. 2) of a predetermined frequency, and supplies it to a driving signal generating circuit 2. The driving signal generating circuit 2 generates a driving signal VL (see a waveform (d) in FIG. 2) from the rectangular wave signal Vp, and supplies it to a switching circuit 3. The switching circuit 3, based on the driving signal VL, applies a rectangular wave AC voltage to the primary side of a pulse transformer 4. The stepped up voltage at the secondary side of the pulse transformer 4 is applied to a discharge lamp 5, thereby lighting the discharge lamp 5.

A dimmer control circuit 6 generates a dimmer signal Vdim having a PWM waveform (see a waveform (a) in FIG. 2) and supplies it to the driving signal generating circuit 2, a rectangular wave reset circuit 7, and an output reset circuit 8. The driving signal generating circuit 2 extracts a burst waveform from the rectangular wave signal Vp in correspondence with the dimmer signal Vdim, and generates the above-mentioned driving signal VL. In response to the rising of the dimmer signal Vdim, the rectangular wave reset circuit 7 outputs a rectangular wave reset signal R1 (as shown by a waveform (b) in FIG. 2) to the rectangular wave generating circuit 1. The waveform (c) in FIG. 2 shows a state in which the rectangular wave signal Vp is reset with the rising of the dimmer signal Vdim, and starts to oscillate again after a time lag t. In response to the falling of the dimmer signal Vdim, the output reset circuit 8 outputs an output reset signal R2 (as shown by a waveform (e) in FIG. 2) to the switching circuit 3.

Note that, in the waveform (e) of FIG. 2, the output reset signal R2 is shown as being generated simultaneously with the falling of the dimmer signal Vdim, but in fact it is generated simultaneously with the completion of the rectangular waveform voltage (not shown in drawing) applied to the primary side of the pulse transformer 4 in response to the driving signal VL. The completion of the rectangular wave voltage corresponds to the termination of the driving signal VL, and the termination of the driving signal VL corresponds to the falling of the dimmer signal Vdim. Therefore, the generation of the output reset signal R2 occurs at a time corresponding to the falling of the dimmer signal Vdim.

Furthermore, the dimmer control circuit 6 of the above-mentioned circuits does not need to be configured internally, and the dimmer signal Vdim may be supplied externally.

Figure 3A:
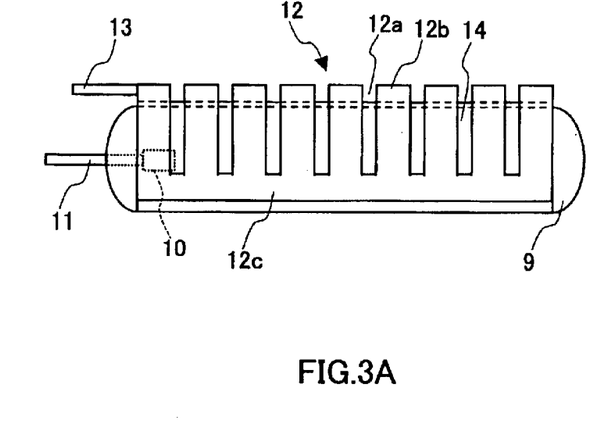
FIG. 3A is a front view of an external electrode type discharge lamp that is an example of a discharge lamp to which the discharge lamp ballast of the present invention is applied.
Figure 3B:
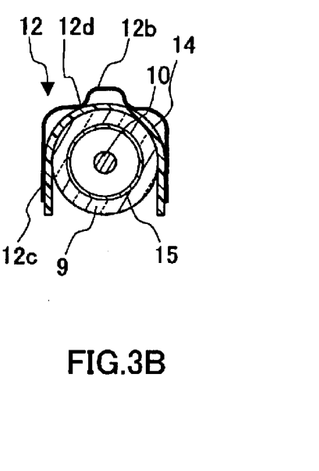
FIG. 3B is a cross-sectional view of the central portion of the same lamp.
Figure 4:
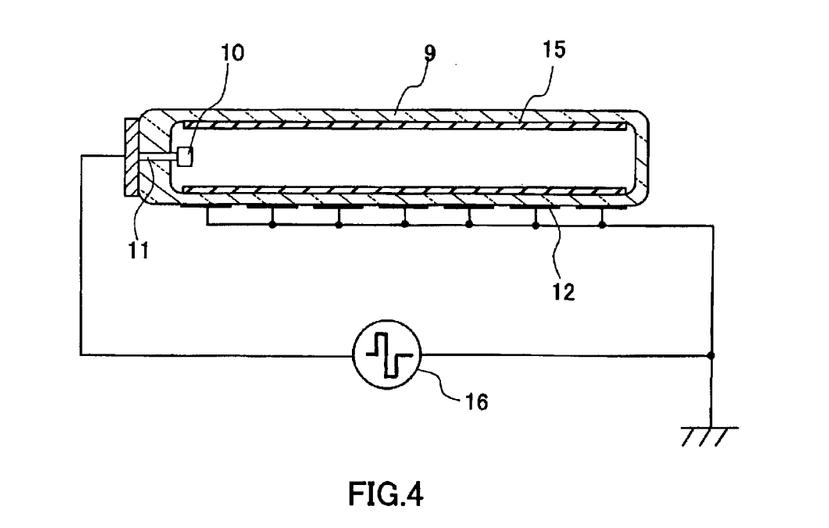
FIG. 4 is a schematic drawing showing how the discharge lamp device of FIG. 3 is connected to the ballast.

FIGS. 3 and 4 show an external electrode discharge lamp that is one example of a discharge lamp 5 for which an embodiment of the discharge lamp ballast of the present invention is applied. FIG. 3A is a front view and FIG. 3B is a cross-sectional view of the central portion. An arc tube 9 is made of cylindrical glass, and a xenon-argon mixed gas is sealed into it as a discharge medium. Fitted inside the arc tube 9, and made of materials such as nickel for example, is an internal electrode 10, which is electrically led outside of the arc tube 9 by a lead line 11.

An external electrode unit 12, which may be made of a flexible phosphor bronze plate, is attached so as to circumferentially cover the arc tube 9 in parts. A lead line 13 is led out from the external electrode unit 12. A dielectric member 14 is arranged between the arc tube 9 and the external electrode unit 12, covering approximately half the circumference of the arc tube 9. The dielectric member 14 is pushed against the outer wall of the arc tube 9 by the external electrode unit 12. Numeral 15 denotes the phosphor layer provided on the inner wall surface of the arc tube 9.

The phosphor bronze plate that forms the external electrode unit 12 has a plurality of circumferential separation grooves 12a, so as to be provided with a plurality of external electrodes 12b separated in the tube axis direction. Also, since the plurality of external electrodes 12b are linked in the tube axis direction by a pair of linking portions 12c, the integrity of the external electrode unit 12 is maintained. Each of the external electrodes 12b has a contiguous portion 12d that is contiguous to the outer wall surface of the arc tube 9, forming a cross-sectional concave-convex form. The linking portions 12c electrically connect the external electrodes 12 of a portion different from the contiguous portion 12d.

According to this configuration, the external electrode unit 12 functions as an external electrode through dielectric member 14, only at the contiguous portions 12d, which are arranged intermittently in a plurality of locations along the axis of the tube.

FIG. 4 is a schematic drawing that shows the discharge lamp device of the above configuration with a ballast circuit 16 connected. A high-frequency rectangular wave voltage is applied between the internal electrode 10 and the external electrode unit 12 from the ballast circuit 16. Due to this, a high-frequency voltage is applied through the glass of the arc tube 9, which is a dielectric, to the xenon-argon mixed gas inside the arc tube 9, and discharge occurs. The xenon-argon mixed gas is ionized and excited by this discharge and emits ultraviolet light, which irradiates onto the phosphor layer 15, thus producing visible light.

The operation of the discharge lamp ballast in FIG. 1 will be explained while referring to the waveform diagram of FIG. 2. At the rising of the dimmer signal Vdim, the rectangular wave generating circuit 1 is reset by a rectangular wave reset signal R1 output from a rectangular wave reset circuit 7. Therefore, as shown by the waveform (c) in FIG. 2, rectangular wave signal Vp starts to oscillate again after a time t from the rising of the dimmer signal Vdim. The driving signal generating circuit 2 extracts a portion of the rectangular wave signal Vp based on the dimmer signal Vdim, and, in order to output it as driving signal VL, operates as follows.

The driving signal generating circuit 2 begins extracting rectangular wave signal Vp at the time when the dimmer signal Vdim becomes on. And at the time when the dimmer signal Vdim and the rectangular wave signal Vp have both been turned off, the extraction of the rectangular wave signal finishes. The waveform (d) in FIG. 2 shows the driving signal VL that has been formed in this way, and its relationship to the dimmer signal Vdim and the rectangular wave signal Vp. The start of the driving signal VL coincides with the timing when the rectangular wave signal Vp, which has been reset by the rising of the dimmer signal Vdim, starts to oscillate again. If the rectangular wave signal Vp is off at the falling of the dimmer signal Vdim, the driving signal VL is completed at that time. If the rectangular wave signal Vp is on at the falling of dimmer signal Vdim, the completion of driving signal VL coincides with the timing of the rectangular wave signal Vp being turned off. Therefore, the final rectangular wave is not cut in the middle.

As the driving signal VL is formed as described above, the dimmer frequency can be adjusted freely without beginning the extraction of the rectangular wave signal Vp midway through an on waveform, and without finishing it midway through an on waveform. This therefore suppresses the flickering of the discharge lamp that is caused by incomplete waveforms of driving signal VL. Also, as the rectangular wave signal Vp is reset at the beginning of the period in which the dimmer signal Vdim is on, the phase of the rectangular wave signal Vp is constant with respect to the beginning of the period in which the dimmer signal Vdim is on. Therefore, even if the frequency of the rectangular wave signal Vp is not an integer multiple of the dimmer signal Vdim, the wave number of the extracted rectangular wave signal Vp is constant for dimmer signals Vdim with a constant duty factor. That is, there is no fluctuation in the wave number of the driving signal VL and flickering of light emitted from the discharge lamp is eliminated.

Figure 5A:
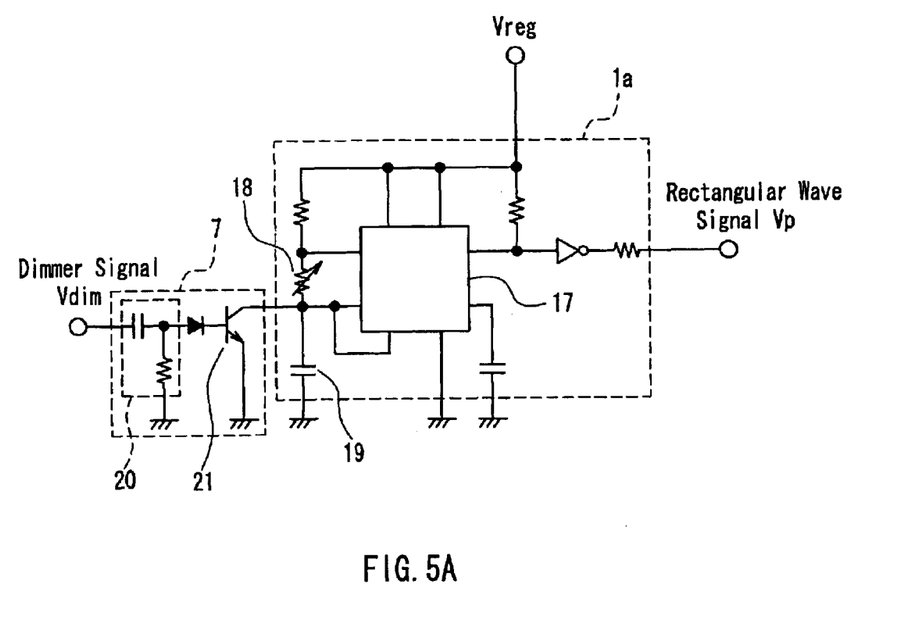
FIG. 5A is a circuit diagram showing an example configuration of the reset circuit portion of the discharge lamp ballast of FIG. 1.

Concerning the rectangular wave generating circuit 1 and the rectangular wave reset circuit 7 in the discharge lamp ballast shown in FIG. 1, a first specific example configuration is shown in FIG. 5A. FIG. 5A is an examplary configuration in which the rectangular wave generating circuit 1a is composed using a timer circuit 17. The rectangular wave signal Vp is output based on the operation of a CR oscillator and the timer circuit 17, according to an variable resistor 18 and a capacitor 19. The CR oscillator is defined as an oscillator in which a frequency is determined by a capacitor and a resistor. The rectangular wave reset circuit 7 is composed of a differential circuit 20 and a switching element 21. Dimmer signal Vdim is input to the differential circuit 20, and the switching element 21 is driven by the output from the differential circuit 20. The node between the variable resistor 18 and the capacitor 19 that constitute the CR oscillator portion is grounded via the switching element 21. The output obtained by differentiating the rising of the dimmer signal Vdim with the differential circuit 20 causes the switching element 21 to momentarily conduct, and the node between the variable resistor 18 and the capacitor 19 to be connected to the ground potential. This causes the capacitor 19 to discharge its electrical charge and the CR oscillator to be reset, the result of which is that the output of the rectangular wave signal Vp is reset.

Figure 5B:
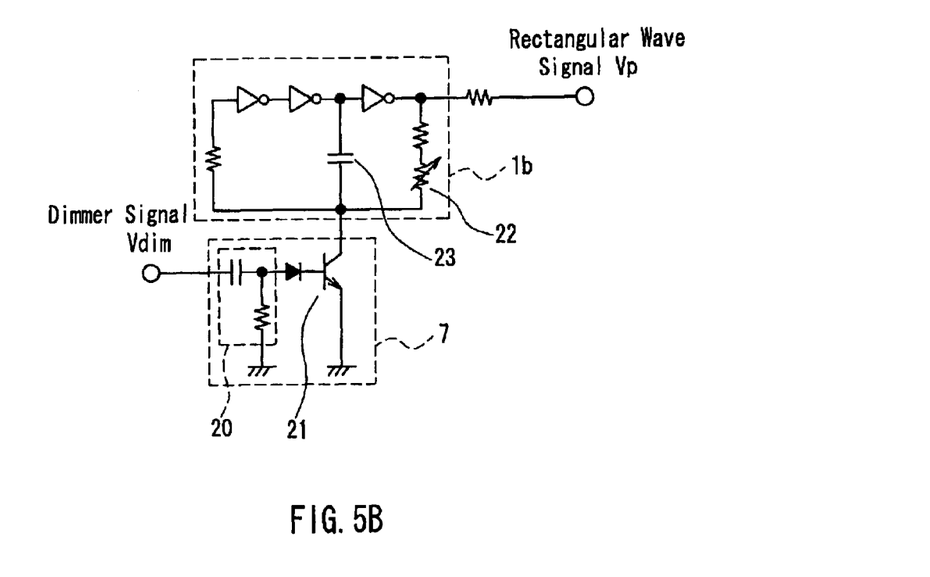
FIG. 5B is a circuit diagram showing another example configuration of the same reset circuit portion.

A second example configuration of the rectangular wave generating circuit 1 is shown in FIG. 5B. FIG. 5B is an example configuration using an astable multivibrator for rectangular wave generating circuit 1b. The rectangular wave reset circuit 7 is the same as that in the configuration in FIG. 5A. The node between an variable resistor 22 and a capacitor 23 composing a CR oscillator in the astable multivibrator is grounded via the switching element 21 that constitutes the differential circuit 20. As in the configuration shown in FIG. 5A, the switching element 21 becomes conducting in response to the rising of the dimmer signal Vdim, and the operation of the CR oscillator is reset, resulting in the output of rectangular wave signal Vp being reset.

The effect of the above configurations can be obtained regardless of whether the oscillation circuit included in the rectangular wave generating circuit 1 is a self-excited type, or an externally excited type. However, in terms of compensating for instability when starting the oscillation, a self-excited type is more effective in the above configuration.

Next, the operation of the output reset circuit 8 will be explained. As stated above, the output reset circuit 8 outputs an output reset signal R2 to the switching circuit 3 in response to the falling of a dimmer signal Vdim. This functions in order to suppress the ringing caused by unregulated voltage resonance, which occurs immediately after the completion of the driving signal VL when a pulse transformer 4 is made to operate via the switching circuit 3 in response to driving signal VL. In order to explain that operation, a specific circuit configuration example of the driving signal generating circuit 2, switching circuit 3, and output reset circuit 8 will first be explained with reference to FIG. 6.

Figure 6:
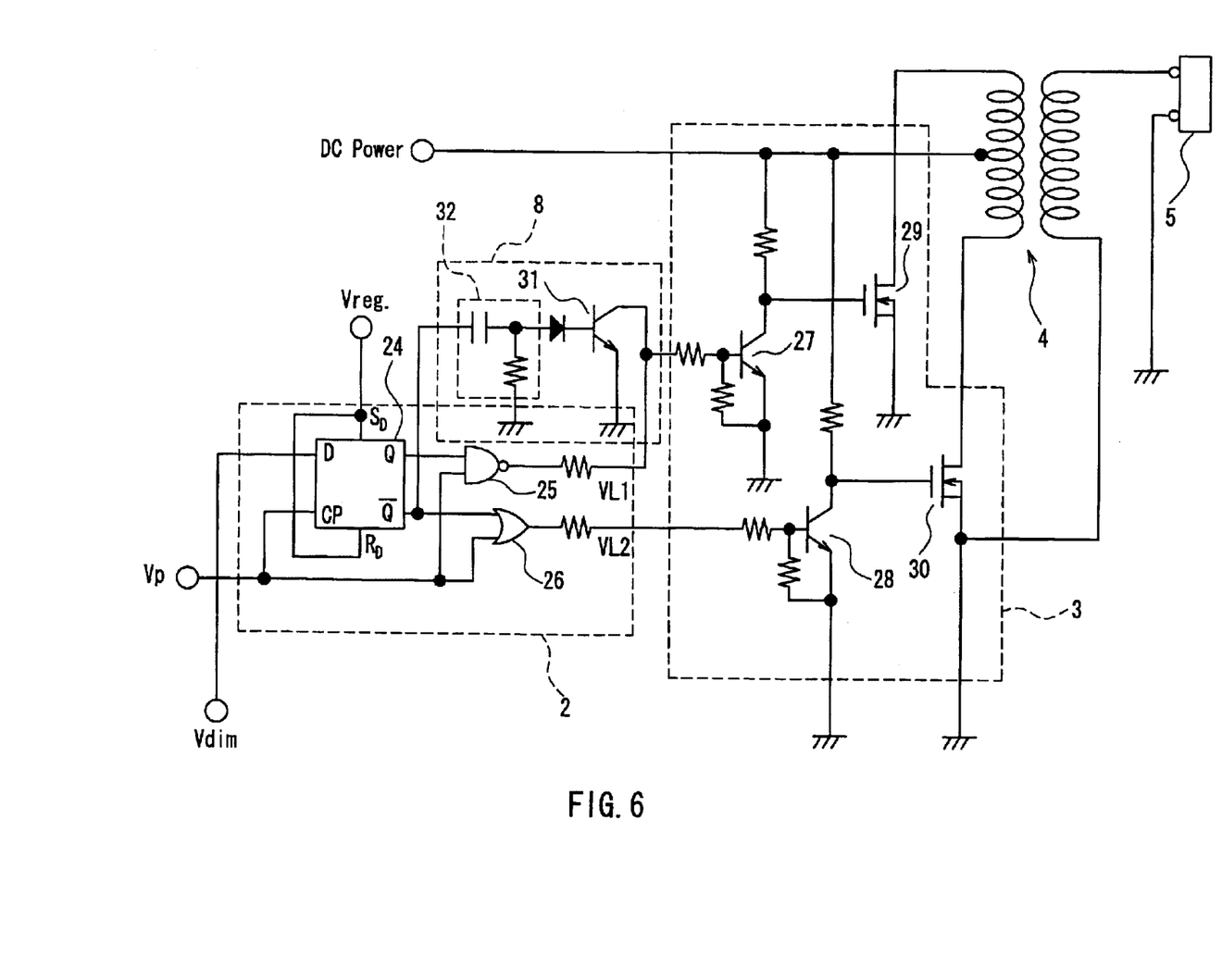
FIG. 6 is a circuit diagram showing an example of the principal elements of a specific configuration of the discharge lamp ballast of FIG. 1.

In FIG. 6, the main elements that constitute the driving signal generating circuit 2 are a flip-flop circuit 24, a NAND circuit 25, and an OR circuit 26. The main elements that constitute the switching circuit 3 are NPN transistors 27 and 28, and FETs 29 and 30. The main elements that constitute the output reset circuit 8 are an NPN transistor 31 and a differential circuit 32. The waveforms of these units are shown in FIG. 7.

The dimmer signal Vdim (a) is input to the data terminal of the flip-flop circuit 24, and the rectangular wave signal Vp (b) is input on the clock pulse terminal. The non-inverted output of flip-flop circuit 24 is shown by a waveform (c) in FIG. 7, and the inverted output is shown by a waveform (d) in FIG. 7. The non-inverted and inverted output of the flip-flop circuit 24 are supplied respectively to one input side of a NAND circuit 25 and one side of an OR circuit. The rectangular wave signal VP is input to other sides of the NAND circuit 25 and the OR circuit 26.

Figure 7:
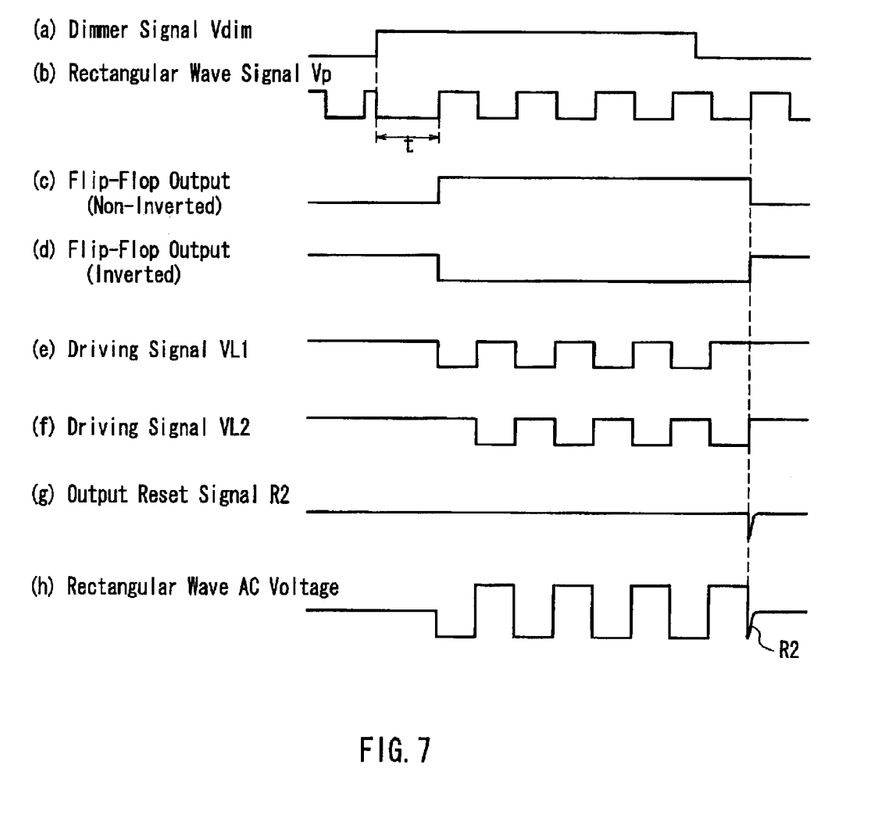
FIG. 7 is a waveform diagram showing the functioning of the circuit in FIG. 6.

The NAND circuit 25 and the OR circuit 26 respectively output a driving signal VL1 and driving signal VL2 as shown by waveforms (e) and (f) in FIG. 7. It should be noted that, because the NPN transistors 27 and 28 are used as switches for driving the FETs 29 and 30, the polarity of driving signals VL1 and VL2 is reversed for the rectangular wave signal Vp (b) in FIG. 7. The driving signals VL1 and VL2 are input respectively to the bases of the NPN transistors 27 and 28, and the FETs 29 and 30 are alternately driven by this switching operation. The result is that the rectangular wave AC voltage (h) shown in FIG. 7 is applied to the primary side of the pulse transformer 4.

The inverted output of the flip-flop circuit 24 is input to the output reset circuit 8, and after passing through the differential circuit 32 it is input to the NPN transistor 31. Therefore, a pulse-shaped output reset signal R2, like that shown as waveform (g) in FIG. 7, is supplied to the NPN transistor 27 from the output reset circuit 8. As the rising of the inverted output of the flip-flop circuit 24 corresponds to the completion of the driving signal VL2, at the time of the completion of the rectangular wave AC voltage (h) in FIG. 7, the FET 29 is momentarily turned on at the same time as the FET 30 is turned off. Therefore, immediately after the completion of the rectangular wave AC voltage, a pulse-shaped reset voltage (indicated as "R2" for convenience) is applied to the primary side of the pulse transformer. This resets the secondary output of the pulse transformer. This operation will be explained with reference to FIGS. 8 and 9.

Figure 8:
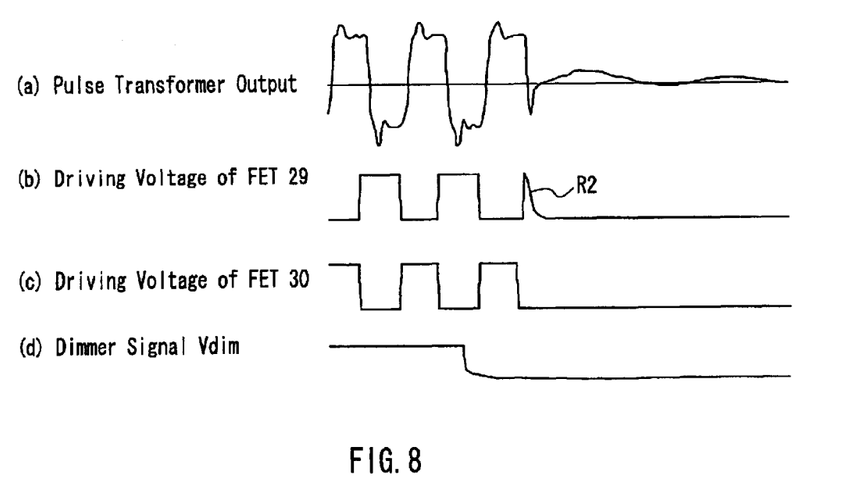
FIG. 8 is a waveform diagram illustrating the operation of the circuit in FIG. 6.
Figure 9:
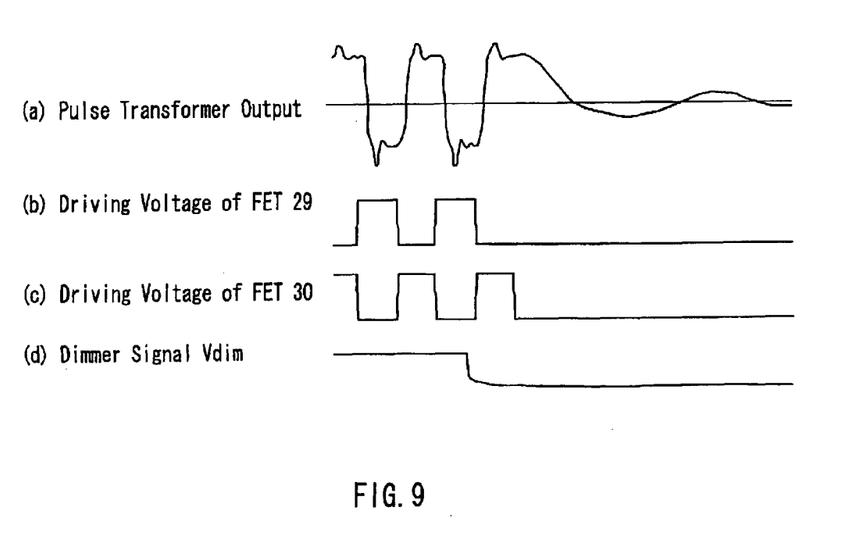
FIG. 9 is a waveform diagram showing the functioning of circuits in a comparative example to the circuits of FIG. 6.

The secondary output waveform of the pulse transformer 4 is shown by (a) in FIG. 8. A waveform (b) shows a driving voltage of FET 29, a waveform (c) a driving voltage of the FET 30, and a waveform (d) the dimmer signal Vdim. The output reset signal R2 is appended after the rectangular waveform of the driving voltage of the FET 29. Waveforms (a) to (d) in FIG. 9 correspond to those in FIG. 8 except for the addition of output reset signal R2.

The secondary side of the pulse transformer 4 is in a charged state when the driving voltage (c) of the FET 30 rises in response to the completion of the dimmer signal Vdim (d), and the charge is reversed by turning off the FET 30. Therefore, in the case of FIG. 9, ringing is produced with the waveform of the secondary side output of the pulse transformer shown by (a) in FIG. 9. In contrast to this, in the case of FIG. 8, due to the existence of output reset signal R2, the FET 29 is momentarily turned on at the same time as the FET 30 is turned off, and a charge is discharged, and thus the secondary side output of the pulse transformer becomes reset. Therefore, as shown by (a) in FIG. 8, ringing is suppressed. The term "reset" here does not necessarily mean that the charge is discharged 100% instantaneously and the secondary side output of the pulse transformer attains a complete zero voltage condition. In the main it means that the charge is sufficiently discharged in a short period of time and the output from the pulse transformer is attenuated to a level attaining a waveform with which erroneous discharges do not occur at the trailing end of the output of the pulse transformer.

The time for which the FET 29 is on, that is, the width of output reset signal R2, varies depending on such factors as the lamp capacity, the transformer step-up ratio, and the resistance value, but it is preferable that it is equal to or less than one-quarter of the waveform of one cycle of driving signal VL. This is because the reverse polarity charge builds up if it is too long. There is no particular lower limit as an adequate effect can be obtained even for short values, but in order to obtain an effect sufficient to release the charge, a value of at least one-eighth is preferable.

In this way, by providing the output reset circuit 8, the ringing that may occur at the secondary side output of the pulse transformer 4 due to the completion of the driving signal VL for each cycle of the dimmer signal Vdim can be suppressed, thus enabling a much greater effect in preventing flickering. However, depending on the settings of various conditions, even without using the output reset circuit 8, it is possible to suppress flickering to within a range that presents no problems in terms of practical application, by only optimizing the generation of the driving signal VL by the driving signal generating circuit 2 and the rectangular wave reset circuit 7.

Additionally, the operational effect of providing the output reset circuit 8 does not presuppose the provision of the rectangular wave reset circuit 7. Furthermore, it is not an essential presupposition that the driving signal generating circuit 2 controls the timing before and after the driving signal VL so that none of the waveforms is cut in the middle. Even when other methods are used to generate the driving signal VL, the suppression provided by the output reset circuit 8 for the ringing that occurs after the completion of each cycle of each rectangular waveform voltage, effectively suppresses flickering.

It should be noted that the operational effect of the output reset circuit 8 is particularly effective when configured so that the completion of the driving signal VL is synchronized with the completion of the on waveform of the rectangular wave signal Vp. In other words, it prevents the flickering that occurs even when prevention is provided for the flickering that occurs when the waveform at the completion of the driving signal VL is unfinished, thus achieving a ballast in which flickering is suppressed with very high accuracy.

The following is a specific configuration example for the signals in a configuration of a discharge lamp ballast:
Frequency of rectangular wave signal Vp: 10 to 50 kHz
Frequency of dimmer signal Vdim: 100 to 300 Hz
Pulse transformer input: 8 to 15 V
Pulse transformer output: $V_{p\text{-}p}$=2.0 kV (±1.0 kV)

Additionally, in order to operate the device stably, it is preferable that the frequency of the dimmer signal Vdim is constant.

The above-described configuration of a ballast can be applied to any type of discharge lamp that uses dielectric barrier discharge. However, it is especially suitable for mercury-free discharge lamps (meaning ones that do not have mercury line spectrums as the main emission of the discharge lamp).

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A discharge lamp ballast comprising:
   a rectangular wave generating circuit that generates a rectangular wave signal of a predetermined frequency;
   a driving signal generating circuit into which the rectangular wave signal and a dimmer signal of a PWM waveform of a frequency lower than that of the rectangular wave signal are input, and which outputs, as a driving signal, a signal obtained by extracting the rectangular wave signal for a period corresponding to a period in which the dimmer signal is on; and
   a pulse transformer in which a rectangular wave voltage based on the driving signal is applied to a primary side, and the rectangular wave voltage is stepped up and applied to a discharge lamp;
   wherein a rectangular wave reset circuit is provided so as to reset the operation of generating rectangular wave signal with the rectangular wave generating circuit at a rising of the dimmer signal, and
   the driving signal generating circuit extracts the rectangular wave signal for a period starting from the dimmer signal is turned on, until a time at which the dimmer signal and the rectangular wave signal are both off.

2. The discharge lamp ballast according to claim 1, wherein the rectangular wave reset circuit is configured so as to reset an oscillation of the rectangular wave generating circuit.

3. The discharge lamp ballast according to claim 2, wherein the rectangular wave reset circuit comprises:

a first differential circuit into which the dimmer signal is input; and a first switching circuit that is driven by an output of the first differential circuit;

wherein a node between a capacitor and a resistor composing a CR oscillator in the rectangular wave generating circuit is connected to a ground potential via the first switching circuit.

4. The discharge lamp ballast according to claim 1, wherein the rectangular wave generating circuit includes a timer circuit.

5. The discharge lamp ballast according to claim 1, wherein the discharge lamp is an external electrode type dishcarge lamp, in which at least one electrode of the discharge lamp is provided at an outer surface of a arc tube.

6. The discharge lamp ballast according to claim 5, wherein a discharge material of the discharge lamp includes a rare gas.

7. A discharge lamp ballast comprising:

a rectangular wave generating circuit that generates a rectangular wave signal of a predetermined frequency;

a driving signal generating circuit into which the rectangular wave signal and a dimmer signal of PWM waveform of a frequency lower than that of the rectangular wave signal input, and which outputs, as a driving signal, an output obtained by extracting the rectangular wave signal for a period corresponding to a period which the dimmer signal is on; and a pulse transfer in which a rectangular wave AC voltage based on the driving signal is applied to a primary side, and the rectangular wave AC voltage is stepped up and applied a discharge lamp;

wherein an output reset circuit is provided so as to input a pulse voltage in phase with the rectangular wave AC voltage to the pulse transformer immediately after an end of the rectangular wave AC voltage in response to a completion of an ON period of the dimmer signal, a secondary side output of the pulse transformer being attenuated by application of the pulse voltage.

8. The discharge lamp ballast according to claim 7, further comprising a second switching circuit that is inserted between the driving signal generating circuit and the pulse transformer, and has two switching elements that are alternately driven in response to the driving signal;

wherein by inputting an output of the switching elements to the pulse transformer, the rectangular wave AC voltage is applied to the pulse transformer, and wherein, the output reset circuit supplies an output reset signal that momentarily drives the switching element that was not being driven immediately prior to the end of the rectangular wave AC voltage.

9. The discharge ballast according to claim 8, wherein the output reset circuit further comprises a second differential circuit into which the driving signal is input, and in which an output of the second differential circuit is supplied as an output reset signal.

10. The discharge lamp ballast according to claim 8, wherein a pulse width of the output reset signal not greater than one-quarter of one cycle of a waveform of the driving signal.

11. The discharge lamp ballast according to claim 7, wherein the rectangular wave generating circuit includes a timer circuit.

12. The discharge lamp ballast according to claim 7, wherein the discharge lamp is an external electrode type discharge lamp, in which at least one electrode of the discharge lamp is provided at an outer surface of a arc tube.

* * * * *

UNITED STATES PATENT AND TRADEMARK OFFICE
CERTIFICATE OF CORRECTION

PATENT NO. : 6,788,006 B2
DATED : September 7, 2004
INVENTOR(S) : Yamamoto

It is certified that error appears in the above-identified patent and that said Letters Patent is hereby corrected as shown below:

Column 10,
Line 59, "starting from the" should read -- starting from when the --

Column 11,
Line 14, "dishcarge lamp," should read -- discharge lamp, --
Line 24, "signal of PWM" should read -- signal of a PWM --
Line 26, "wave signal input," should read -- wave signal are input, --
Line 28, "signal for a period" should read -- signal of a period --
Lines 28-29, "a period which" should read -- a period in which --
Line 30, "a pulse transfer" should read -- a pulse transformer --
Line 33, "applied a discharge" should read -- applied to a discharge --
Line 35, "voltage in phase" should read -- voltage in a phase --

Column 12,
Line 18, "discharge ballast" should read -- discharge lamp ballast --

Signed and Sealed this

Twelfth Day of April, 2005

JON W. DUDAS
*Director of the United States Patent and Trademark Office*